United States Patent
Takaki et al.

(10) Patent No.: US 11,060,902 B2
(45) Date of Patent: Jul. 13, 2021

(54) ABNORMALITY TREATMENT APPARATUS FOR ROTATING MACHINE, AND ROTATING MACHINE SYSTEM

(71) Applicant: KOBE STEEL, LTD., Hyogo (JP)

(72) Inventors: Shugo Takaki, Takasago (JP); Yoshinori Kurioka, Takasago (JP); Yasuharu Matsumoto, Takasago (JP); Eiji Takahashi, Kobe (JP); Kaname Araki, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 77 days.

(21) Appl. No.: 16/443,193

(22) Filed: Jun. 17, 2019

(65) Prior Publication Data

US 2019/0391005 A1    Dec. 26, 2019

(30) Foreign Application Priority Data

Jun. 26, 2018  (JP) .............................. JP2018-121141

(51) Int. Cl.
- *G01H 17/00* (2006.01)
- *G01M 13/00* (2019.01)
- *G01N 29/44* (2006.01)

(52) U.S. Cl.
CPC ............ *G01H 17/00* (2013.01); *G01M 13/00* (2013.01); *G01N 29/4454* (2013.01)

(58) Field of Classification Search
CPC .............. G01N 29/4454; G01N 29/46; G01N 29/4445; G01N 29/12; G01N 29/14; G01H 17/00; G01M 13/00; G01M 13/045; G01M 13/028
See application file for complete search history.

(56) References Cited

U.S. PATENT DOCUMENTS

| | | | | |
|---|---|---|---|---|
| 5,445,027 A | * | 8/1995 | Zorner | G01N 29/14 73/593 |
| 2006/0275145 A1 | * | 12/2006 | Takahashi | B60H 1/3219 417/222.2 |
| 2017/0184445 A1 | * | 6/2017 | Araki | G01M 99/00 |
| 2017/0205276 A1 | * | 7/2017 | Araki | G01M 99/00 |

(Continued)

FOREIGN PATENT DOCUMENTS

| | | |
|---|---|---|
| CN | 108139367 A | 6/2018 |
| JP | S52-089702 A | 7/1977 |

(Continued)

OTHER PUBLICATIONS

English Translation of JP52-89702.*

(Continued)

*Primary Examiner* — Helen C Kwok
(74) *Attorney, Agent, or Firm* — Studebaker & Brackett PC

(57) ABSTRACT

An abnormality treatment apparatus includes: a sensor which outputs a signal upon detecting an event caused by contact of a rotor of a rotating machine during rotation of the rotor; and a control unit which executes at least one of rotation number control of reducing the number of rotations of the rotor step by step, liquid injection control of injecting liquid into a housing chamber of the rotor step by step, and pressure control of lowering a discharge pressure of the rotating machine step by step based on reception of the signal output from the sensor.

7 Claims, 7 Drawing Sheets

(56) References Cited

U.S. PATENT DOCUMENTS

| | | | | |
|---|---|---|---|---|
| 2017/0212085 A1* | 7/2017 | Kajita | .................... | G01N 29/46 |
| 2017/0328240 A1* | 11/2017 | Oh | .......................... | F01D 15/10 |
| 2018/0306671 A1 | 10/2018 | Araki et al. | | |
| 2019/0072093 A1* | 3/2019 | Tajima | ................ | F04C 29/0007 |

FOREIGN PATENT DOCUMENTS

| | | |
|---|---|---|
| JP | S63-295805 A | 12/1988 |
| JP | 2001-107871 A | 4/2001 |

OTHER PUBLICATIONS

The extended European search report issued by the European Patent Office dated Nov. 14, 2019, which corresponds to European Patent Application No. 19181087.8-1001 and is related to U.S. Appl. No. 16/443,193.

\* cited by examiner

ABNORMALITY TREATMENT APPARATUS FOR ROTATING MACHINE, AND ROTATING MACHINE SYSTEM

FIELD OF THE INVENTION

The present invention relates to an abnormality treatment apparatus for a rotating machine, and a rotating machine system.

BACKGROUND ART

As disclosed in Japanese Unexamined Patent Publication No. 2016-57246, an abnormality detecting apparatus for detecting contact of a rotor of a rotating machine is known. The abnormality detecting apparatus disclosed in Japanese Unexamined Patent Publication No. 2016-57246 has a sensor which detects an elastic wave generated when the rotor contacts something during its rotation. The sensor detects an elastic wave to specify a contact position of the rotor.

While the abnormality detecting apparatus disclosed in Japanese Unexamined Patent Publication No. 2016-57246 specifies a contact position of a rotor during its rotation, the abnormality detecting apparatus does not take into consideration treatment to be made when contact of the rotor is detected. It is highly possible to avoid a serious failure if a rotating machine is stopped as soon as abnormality is detected. Meanwhile, if stop of the rotating machine can be prevented by taking a measure of avoiding a failure, it is more preferable, in terms of operation, to continue operation of the rotating machine than to immediately stop the operation when abnormality is detected. This enables improvement of operation efficiency.

SUMMARY OF THE INVENTION

An object of the present invention is to enable a rotating machine to continue operation as much as possible even when rotor contact occurs.

An abnormality treatment apparatus for a rotating machine according to one aspect of the present invention includes: a sensor configured to output a signal upon detecting an event caused by contact of a rotor of the rotating machine during rotation of the rotor; and a control unit for executing at least one control of rotation number control of reducing the number of rotations of the rotor step by step, liquid injection control of injecting liquid into a housing chamber of the rotor step by step, and pressure control of lowering a discharge pressure of the rotating machine step by step, based on reception of the signal output from the sensor.

DESCRIPTION OF EMBODIMENTS

In the following, embodiments will be described in detail with reference to the drawings.

Figure 1:
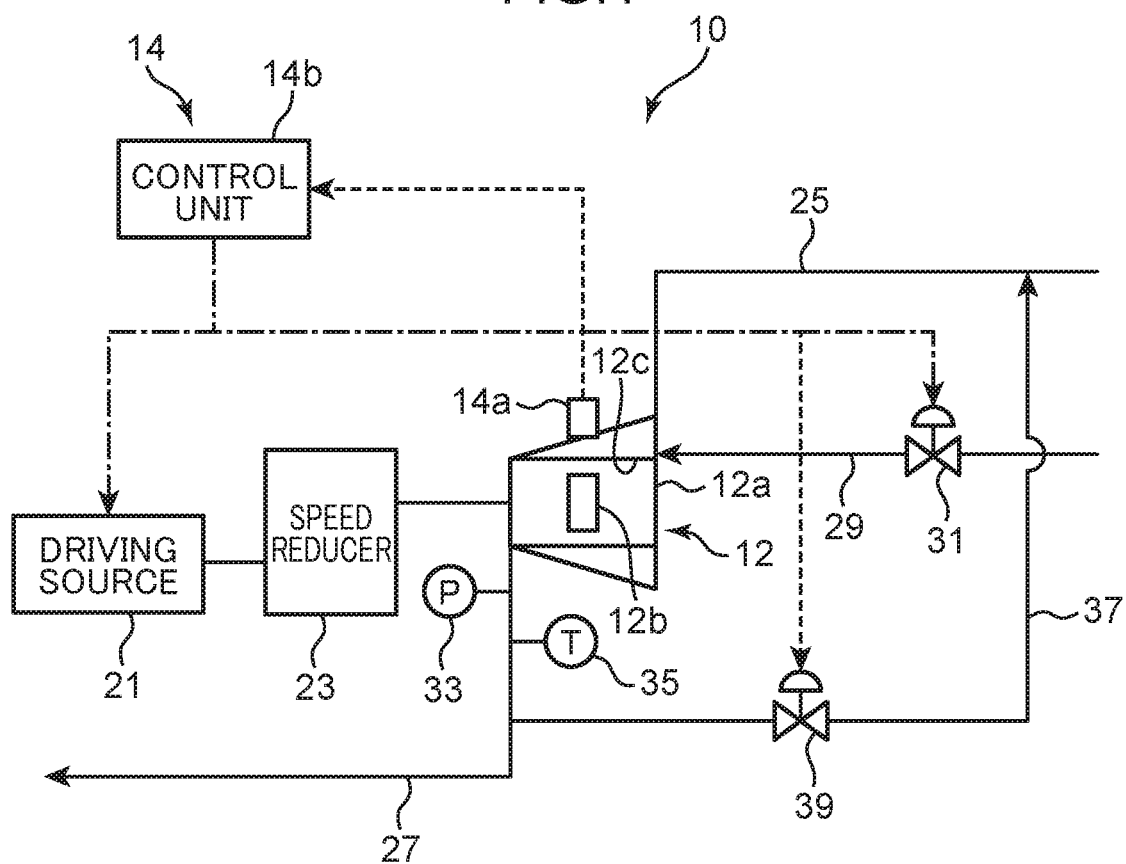
FIG. 1 is a diagram showing a schematic configuration of a rotating machine system according to an embodiment.

As shown in FIG. 1, a rotating machine system 10 according to the present embodiment is provided with a rotating machine 12, and an abnormality treatment apparatus 14 for the rotating machine 12. The rotating machine 12 has a casing 12a in which a rotor 12b, and a housing chamber 12c housing the rotor 12b are provided. The rotor 12b is connected to a driving source 21 such as a motor which generates a driving force that causes the rotor 12b to rotate via a speed reducer 23.

The rotating machine 12 can be any of a compressor, a blower, a pump, a turbine, and the like that pressurize and depressurize gaseous fluid such as air by rotation of the rotor 12b. It is assumed that the rotating machine 12 is configured with a compressor in the present embodiment. Accordingly, the rotating machine 12 sucks air in a suction line 25 through a suction port and compresses the sucked air. The air compressed in the housing chamber 12c (compression chamber) in which the rotor 12b is housed is discharged from a discharge port to the discharge line 27. The compression chamber present in the housing chamber 12c is a space defined by an inner surface of the housing chamber 12c and the rotor 12b. The rotor 12b can be connected to the driving source 21 via a speed increaser, in place of the speed reducer 23.

A liquid injection line 29 is connected to the rotating machine 12. The liquid injection line 29 is a line for sending cooling fluid such as water, organic solvent, or the like into the housing chamber 12c. The liquid injection line 29 is connected to the casing 12a so as to communicate with the housing chamber 12c. There is arranged in the liquid injection line 29 a liquid injection valve 31 formed with an electric valve having an adjustable opening. When the liquid injection valve 31 is opened, cooling fluid flows through the liquid injection line 29 at a flow rate according to the opening of the liquid injection valve 31 and is supplied into the housing chamber 12c. The liquid injection valve 31 may be constantly opened during operation of the rotating machine 12, or may be maintained in a closed state during normal operation and opened only when liquid injection control to be described later is executed. Specifically, in a normal state where no abnormality is detected, the liquid injection line 29 of the present embodiment does not execute liquid injection, and executes the liquid injection to the housing chamber 12c on the basis of an output of a signal indicative of abnormality from a sensor 14a to be described later. However, this is not always the case. The liquid injection line 29 may be configured to inject liquid into the housing chamber 12c of the rotor 12b even when the signal indicative of abnormality is not output from the sensor 14a to be described later.

The discharge line 27 is provided with a pressure detector 33 and a temperature detector 35. The discharge line 27 is a line through which fluid discharged from the rotating machine 12 flows. The pressure detector 33 detects a pressure of a gaseous fluid such as air, process gas, flare gas, or the like discharged from the rotating machine 12 and outputs a signal indicative of a detection value. The temperature detector 35 detects a temperature of a gaseous fluid such as air discharged from the rotating machine 12 and outputs a signal indicative of a detection value.

A return line 37 is connected to the discharge line 27. A front end of the return line 37 is connected to the suction line 25. There is arranged in the return line 37 a return valve 39 formed with an electric valve having an adjustable opening. When the return valve 39 is opened, a part of the gaseous fluid flowing through the discharge line 27 is returned to the suction line 25 through the return line 37. A flow rate of the gaseous fluid returned from the discharge line 27 to the suction line 25 is changed according to the opening of the return valve 39. Therefore, the larger the opening of the return valve 39 becomes, the more the gaseous fluid pressure in the discharge line 27 is reduced.

The abnormality treatment apparatus 14 is provided with the sensor 14a which detects abnormality of the rotor 12b and a control unit 14b which executes prescribed control according to a detection result of the sensor 14a.

The sensor 14a is attached to the casing 12a of the rotating machine 12. The sensor 14a is configured to output a signal indicative of abnormality (hereinafter, referred to as an abnormality signal) upon detecting an event caused by contact of the rotor 12b with the casing 12a (the inner surface of the housing chamber 12c). Specifically, when the rotor 12b contacts the casing 12a during rotation of the rotor 12b, for example, ultrasonic waves, vibration, and the like are generated. Accordingly, the sensor 14a is configured with an AE (Acoustic Emission) sensor, a vibration sensor, or the like to detect ultrasonic waves, vibration, or the like as an event caused by contact. The abnormality signal output from the sensor 14a is input to the control unit 14b. The sensor 14a continues outputting the abnormality signal while the event is detected.

The control unit 14b is electrically connected to the sensor 14a, the driving source 21, the liquid injection valve 31, and the return valve 39. The control unit 14b is configured to execute notice control such as sounding of alarm (not shown) or lighting of a warning lamp (not shown), as well as executing control (rotation number control) of reducing the number of rotations of the rotor 12b step by step upon receiving the abnormality signal output from the sensor 14a. The control unit 14b is also configured to execute control (liquid injection control) of injecting liquid into the housing chamber 12c in a case where the notice control is still continued even after the rotation number control is executed. The control unit 14b is also configured to execute control (pressure control) of lowering a discharge pressure of the rotating machine 12 in a case where the notice control is still continued even after the liquid injection control is executed. The control unit 14b is also configured to stop operation of the rotating machine 12 in a case where the notice control is still continued even after the pressure control is executed.

Figure 2:
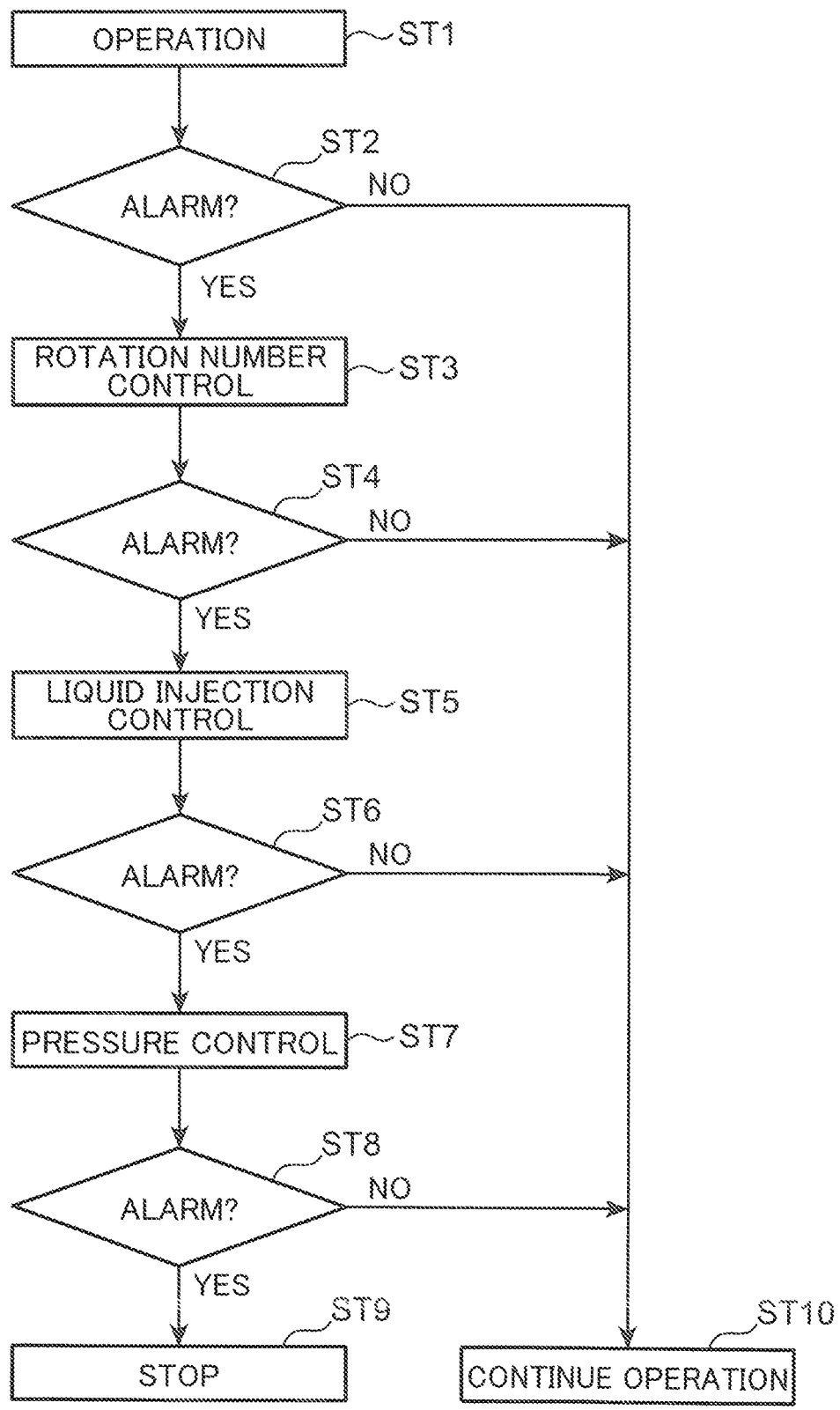
FIG. 2 is a flow chart showing a flow of an abnormality treatment method executed by an abnormality treatment apparatus of the rotating machine system.

Here, description will be made of an abnormality treatment method executed by the control unit 14b with reference to FIG. 2. FIG. 2 shows a flow of control executed by the control unit 14b when the sensor 14a detects an event caused by contact of the rotor 12b with the casing 12a.

First, during operation of the rotating machine 12, i.e., when the rotor 12b rotates upon receiving a driving force of the driving source 21 (step ST1), the control unit 14b monitors whether the notice control is executed or not (step ST2). When the control unit 14b receives the abnormality signal from the sensor 14a to execute the notice control, the processing proceeds to step ST3. While receiving the abnormality signal, the control unit 14b continues executing the notice control.

In step ST3, the control unit 14b executes the rotation number control. This makes the number of rotations of the rotor 12b be lowered to a predetermined lower limit value step by step. The control unit 14b checks whether the notice control is still executed or not even during execution of the rotation number control, and even when the number of rotations of the rotor 12b is reduced to the predetermined lower limit value to end the rotation number control, the control unit 14b checks whether the notice control is still executed or not (step ST4).

In a case where even after the rotation number control is executed, the notice control is still executed (YES in step ST4), the control unit 14b executes the liquid injection control (step ST5). This makes the liquid injection valve 31 be opened (or the liquid injection valve 31 is controlled such that the opening of the liquid injection valve 31 becomes larger than in a normal state where no abnormality is detected). Release of the liquid injection valve 31 (or an increase in the opening) is executed to increase the opening step by step while monitoring a discharge temperature of the rotating machine 12. As a result of releasing of the liquid injection valve 31 to a maximum opening, when the discharge temperature is lowered to a predetermined lower limit value, the liquid injection control ends. The control unit 14b checks whether the notice control is still executed or not during execution of the liquid injection control.

In a case where even when the liquid injection control is ended, the notice control is still executed (YES in step ST6), the control unit 14b executes the pressure control (step ST7). This makes the return valve 39 be opened by a prescribed opening. Release of the return valve 39 is executed such that the opening of the return valve is increased step by step while monitoring the discharge pressure of the rotating machine 12. When the return valve 39 is fully opened, the pressure control ends. The control unit 14b checks whether the notice control is still executed during the execution of the pressure control or not. In a case where even after the end of the pressure control, the notice control is executed (YES in step ST8), the control unit 14b stops the operation of the rotating machine 12 (step ST9). On the other hand, when determination is made in steps ST4, ST6, and ST8 that the notice control is ended, the operation of the rotating machine 12 is continued (step ST10).

Figure 3:
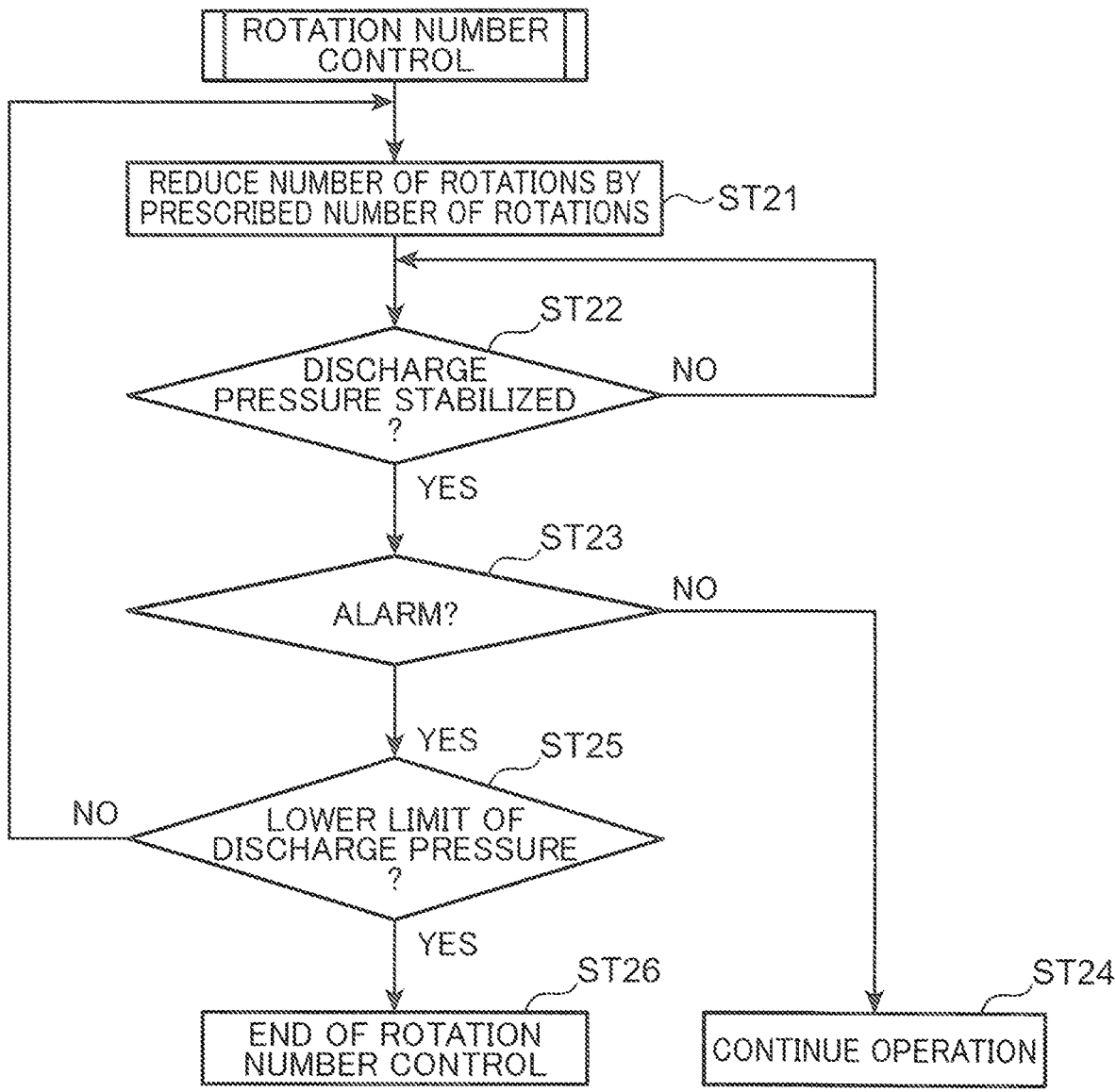
FIG. 3 is a flow chart showing a flow of rotation number control in the abnormality treatment method.

Next, the rotation number control will be more specifically described with reference to FIG. 3. In the rotation number control, the control unit 14b first reduces the number of rotations of the rotor 12b by the number of rotations set in advance (step ST21). Specifically, while the rotating machine 12 operates at a number of rotations set so as to obtain a prescribed discharge flow rate (or discharge pressure), when the notice control is executed (YES in step ST2 in FIG. 2), the control unit 14b reduces the number of rotations down to the number of rotations obtained by subtracting a prescribed number of rotations from the set number of rotations.

Then, after the number of rotations is reduced, the control unit 14b refers to a detected pressure of the pressure detector 33 to determine whether the discharge pressure is stabilized or not (step ST22). Specifically, since the discharge pressure is lowered as a result of reduction of the number of rotations of the rotating machine 12, the control unit 14b determines whether the discharge pressure is stabilized or not depending on whether a pressure change in a prescribed time falls within a prescribed range or not after the discharge pressure is lowered. If the pressure change is within the prescribed range, the control unit 14*b* determines that the discharge pressure is stable, so that the processing proceeds from step ST22 to step ST23.

Instead of determining whether the discharge pressure is stabilized or not in step ST22, the control unit 14*b* may refer to a detected temperature of the temperature detector 35 to determine whether the discharge temperature is stabilized or not.

In step ST23, the control unit 14*b* determines whether the notice control is still executed or not. When the notice control is ended, operation at the reduced number of rotations is continued (step ST24). By contrast, if the notice control is still executed even after the discharge pressure is stabilized after the number of rotations is reduced, the processing proceeds from step ST23 to step ST25, so that the control unit 14*b* checks whether the discharge pressure is lowered to a lower limit value or not (step ST25). If the discharge pressure is not lowered to the lower limit value, the processing returns to step ST21, so that the control unit 14*b* reduces the number of rotations of the rotor 12*b* by the number of rotations set in advance. Step-by-step reduction in the number of rotations will be repeated until the discharge pressure reaches the lower limit value set in advance, and when the discharge pressure reaches the lower limit value, the rotation number control ends (step ST26).

Figure 4:
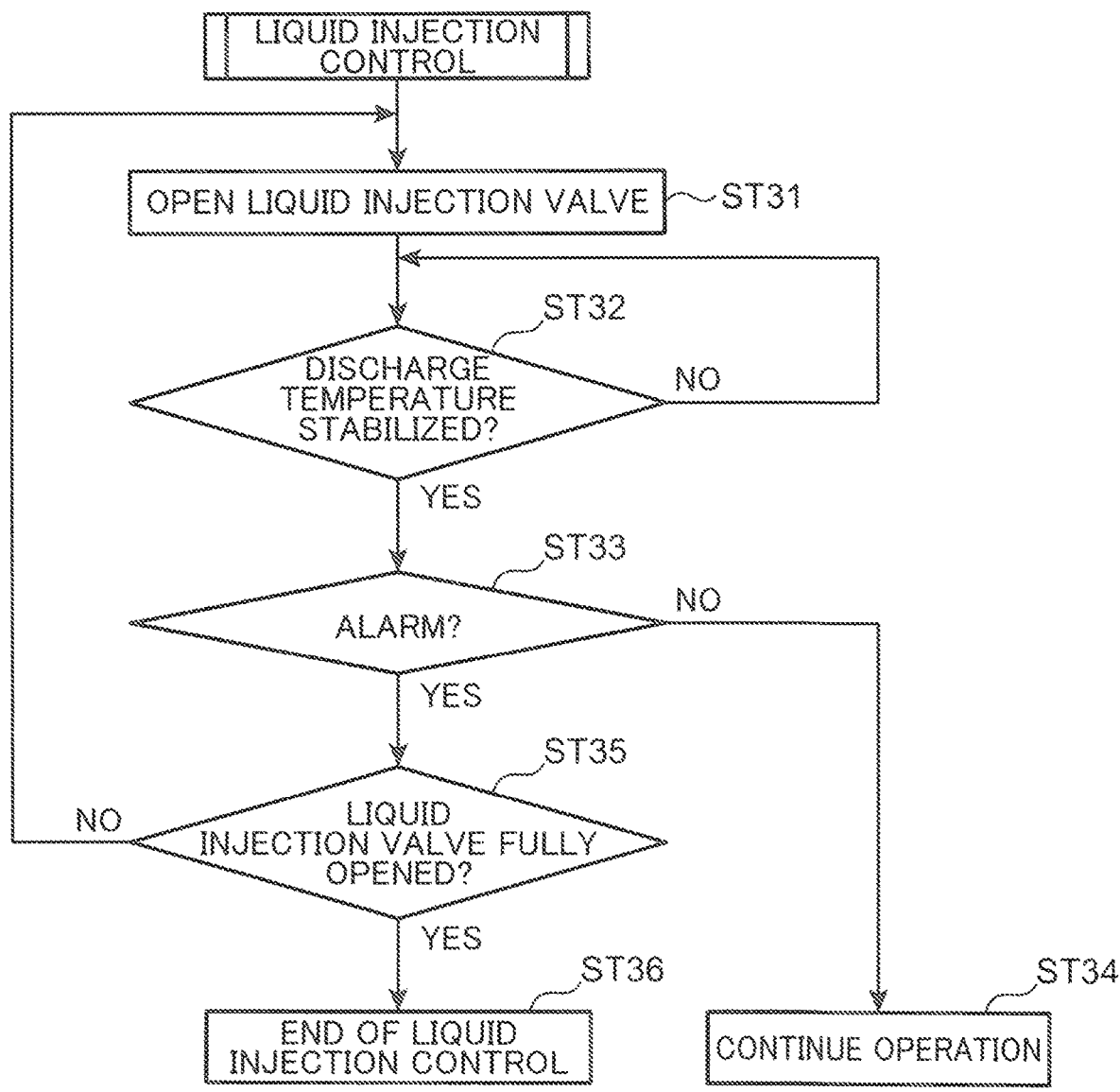
FIG. 4 is a flow chart showing a flow of liquid injection control in the abnormality treatment method.

Next, the liquid injection control will be more specifically described with reference to FIG. 4. In a case where the notice control is still executed even after the end of the rotation number control (YES in step ST4 in FIG. 2), the liquid injection control is executed.

In the liquid injection control, first, the control unit 14*b* opens the liquid injection valve 31 by an opening set in advance (step ST31). Then, after releasing the liquid injection valve 31 by a prescribed opening, the control unit 14*b* refers to a detected temperature of the temperature detector 35 to determine whether an discharge temperature is stabilized or not (step ST32). Specifically, since injecting liquid into the housing chamber 12*c* leads to reduction in the discharge temperature, whether the discharge temperature is stabilized or not is determined depending on whether a temperature change in a prescribed time after the discharge temperature is lowered is within a prescribed range or not. When the temperature change is within the prescribed range, the control unit 14*b* determines that the discharge temperature is stabilized. The processing thus proceeds from step ST32 to step ST33.

In step ST33, the control unit 14*b* determines whether the notice control is still executed or not. When the notice control is ended, the operation is continued as it is (step ST34). On the other hand, if the notice control is still executed even after the discharge temperature is stabilized after the liquid injection is executed, the processing proceeds to step ST35, so that the control unit 14*b* checks whether the liquid injection valve 31 has been opened to the maximum opening or not. If the valve is not fully opened, the processing returns to step ST31, so that the control unit 14*b* opens the liquid injection valve 31 from the current opening by the opening set in advance. Thus, control is executed of increasing the opening of the liquid injection valve 31 step by step while monitoring the discharge temperature until the opening of the liquid injection valve 31 reaches the maximum opening, and when the liquid injection valve 31 is fully opened, the liquid injection control is ended (step ST36).

Figure 5:
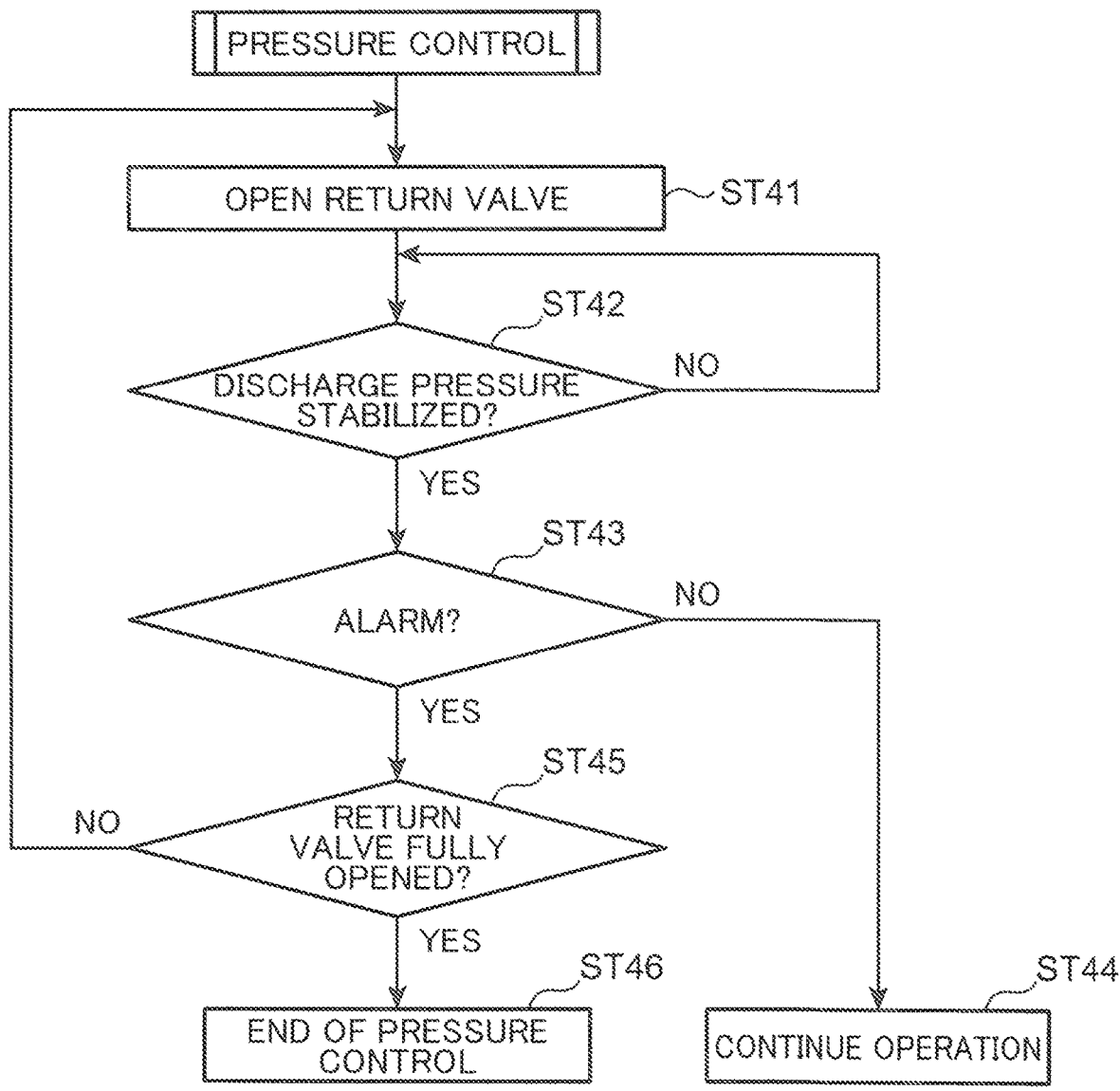
FIG. 5 is a flow chart showing a flow of pressure control in the abnormality treatment method.

Next, the pressure control will be more specifically described with reference to FIG. 5. In a case where the notice control is still executed even after the end of the liquid injection control (YES in step ST6 in FIG. 2), the pressure control is executed.

In the pressure control, the control unit 14*b* first opens the return valve 39 by the opening set in advance (step ST41). Then, after opening the return valve 39 by prescribed opening, the control unit 14*b* refers to a detected pressure of the pressure detector 33 to determine whether the discharge pressure is stabilized or not (step ST42). In other words, since the discharge pressure is lowered by opening the return valve 39, whether the discharge pressure is stabilized or not is determined depending on whether the pressure change in a prescribed time after the reduction of the discharge pressure is within a prescribed range or not. If the pressure change of the discharge pressure is within the prescribed range, the control unit 14*b* determines that the discharge pressure is stabilized, so that the processing proceeds from step ST42 to step ST43.

In step ST43, the control unit 14*b* determines whether the notice control is still executed or not. When the notice control is ended, the operation is continued as it is (step ST44). On the other hand, if the notice control is still executed even after the discharge pressure is stabilized after the opening of the return valve 39 is increased, the processing proceeds to step ST45. The control unit 14*b* thus checks whether the return valve 39 is opened to the maximum opening or not (step ST45). If the return valve 39 is not fully opened, the processing returns to step ST41, so that the control unit 14*b* opens the return valve 39 from the current opening by the opening set in advance. In this manner, control is executed of increasing the opening of the return valve 39 step by step while monitoring the discharge pressure until the opening of the return valve 39 reaches the maximum opening. When the return valve 39 is fully opened, the pressure control is ended (step ST46).

As described in the foregoing, in the present embodiment, upon detecting an event caused by contact of the rotor 12*b*, the sensor 14*a* outputs an abnormality signal. Upon receiving the abnormality signal, the control unit 14*b* executes the rotation number control. Since when the rotation number control is executed, the number of rotations of the rotor 12*b* is reduced, contact of the rotor 12*b* might be eliminated. Even if a contact state is continued even after the rotation number control, step-by-step reduction in the number of rotations of the rotor 12*b* can bring about a state where the contact of the rotor 12*b* is eliminated or a state of little contact. Additionally, since the number of rotations of the rotor 12*b* is reduced step by step, a harmful effect caused by the reduction in the number of rotations from an optimum state can be suppressed. Accordingly, operation can be continued while preventing the rotating machine 12 from developing a failure. Additionally, since when the liquid injection control is executed after the rotation number control, liquid is introduced into the housing chamber 12*c*, the temperature of the rotor 12*b* is lowered. In this manner, contact of the rotor 12*b* might be eliminated. Also in a case where the liquid injection control is executed, even if the contact state is continued, step by step liquid injection can bring about the state where the contact of the rotor 12*b* is eliminated or the state of little contact. Additionally, since the liquid is injected step by step, a harmful effect caused by lowering of the temperature in the housing chamber 12*c* from an optimum state can be suppressed. Accordingly, operation can be continued while preventing the rotating machine 12 from developing a failure. Additionally, since when the pressure control is executed after the liquid injection control, the ejection temperature is lowered, contact of the rotor 12b might be eliminated due to heat contraction of the rotor 12b. In a case where when the pressure control is executed, even if the contact state continues, lowering the discharge pressure step by step can bring about the state where the contact of the rotor 12b is eliminated or the state of little contact. Additionally, since the discharge pressure is lowered step by step, a harmful effect caused by lowering of the discharge pressure from an optimum state can be suppressed. Accordingly, operation can be continued while preventing the rotating machine 12 from developing a failure.

Also in the present embodiment, the control unit 14b is configured to execute the liquid injection control after the rotation number control. Since the liquid injection control is executed only when, even if the rotation number control is executed, the contact is not eliminated or the degree of the contact is not reduced, it is possible to eliminate the contact while maintaining the state where the temperature in the housing chamber 12c is not lowered from an optimum state as much as possible.

Also in the present embodiment, the control unit 14b is configured to execute the pressure control also after the execution of the rotation number control and the liquid injection control. Therefore, even in a case where the contact is not eliminated or in a case where the contact is not reduced even by the rotation number control and the liquid injection control, the pressure control might eliminate such a state, and execution of this control is therefore effective in such a case. Specifically, execution of the plurality of controls when contact occurs, even if no cause of contact is found, might eliminate the contact of the rotor 12b and is therefore effective in such a case.

Also in the present embodiment, after the number of rotations of the rotor 12b is reduced by a prescribed number of rotations in the rotation number control, the control unit 14b waits for the discharge pressure or the discharge temperature to be stabilized. Even when the discharge pressure or the discharge temperature is stabilized, if the abnormality signal is output from the sensor 14a, the control unit 14b again reduces the number of rotations of the rotor 12b. Accordingly, it is possible to more precisely determine an effect obtained by the reduction in the number of rotations of the rotor 12b and is also possible to reduce the number of rotations by a necessary number.

In the present embodiment, after injecting liquid, the control unit 14b waits for the discharge temperature to be stabilized in the liquid injection control. Even when the discharge temperature is stabilized, if the abnormality signal is output from the sensor 14a, the control unit 14b again injects liquid. Accordingly, it is possible to more precisely determine an effect obtained by injecting the liquid and also possible to suppress excessive liquid injection because only a necessary amount of liquid can be injected.

In the present embodiment, after reducing the discharge pressure, the control unit 14b waits for the discharge pressure or the discharge temperature to be stabilized in the pressure control. Even when the discharge pressure or the discharge temperature is stabilized, if the abnormality signal is output from the sensor 14a, the control unit 14b again lowers the discharge pressure. Accordingly, it is possible to more precisely determine an effect obtained by lowering the discharge pressure and also possible to lower the discharge pressure by a necessary amount.

Figure 6:
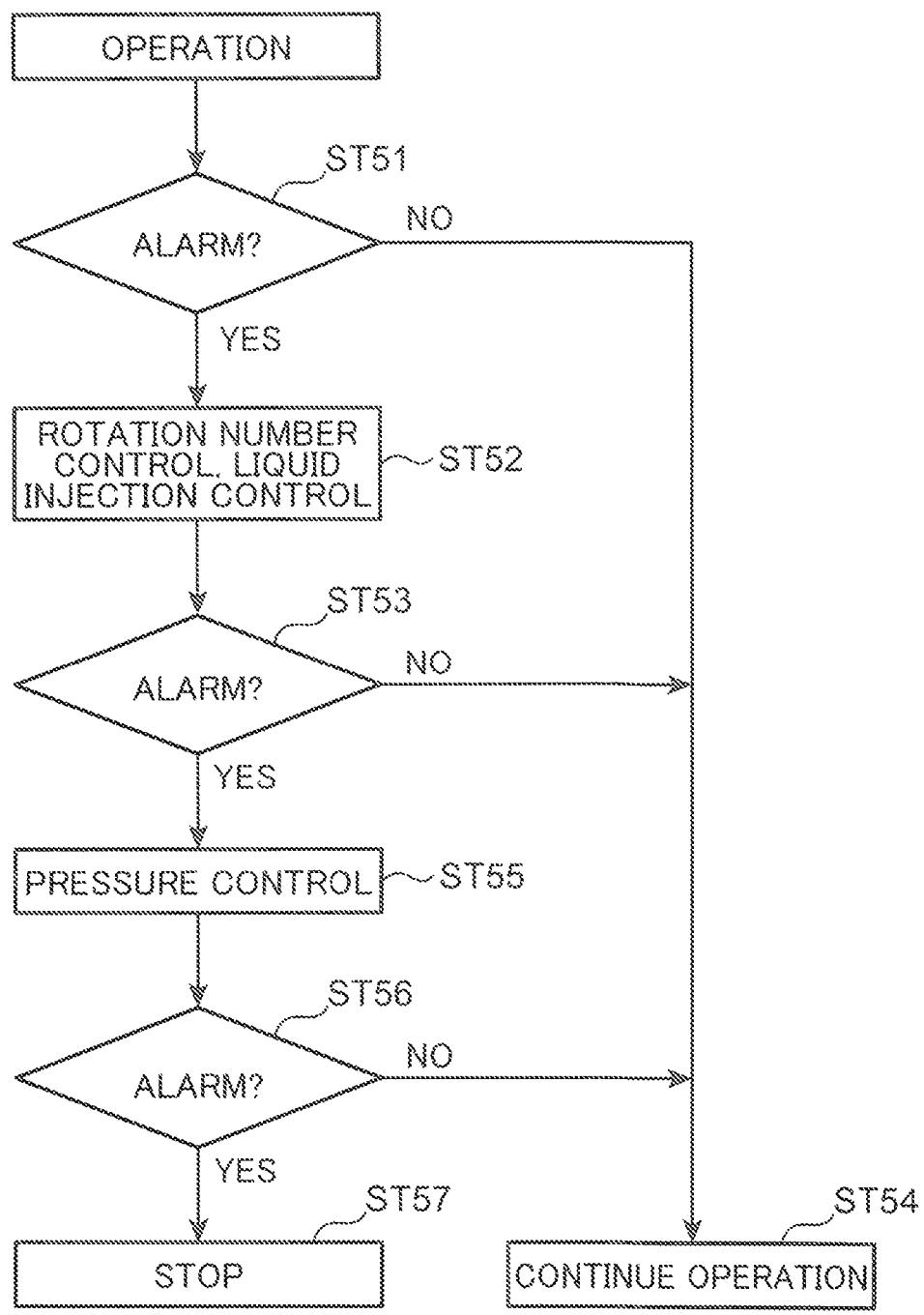
FIG. 6 is a flow chart showing a flow of an abnormality treatment method executed by an abnormality treatment apparatus of a rotating machine system according to another embodiment.

The present invention is not limited to the above embodiment but allows for various modifications, improvement, and the like without departing from the gist of the present invention. In the embodiment, in a case where the notice control is still continued even after the rotation number control is ended, the control unit 14b executes the liquid injection control. The control unit 14b may be instead configured to simultaneously execute the rotation number control and the liquid injection control as shown in FIG. 6. In this case, when the notice control is executed during the operation of the rotating machine 12 (YES in step ST51), the control unit 14b simultaneously executes the rotation number control and the liquid injection control (step ST52).

Figure 7:
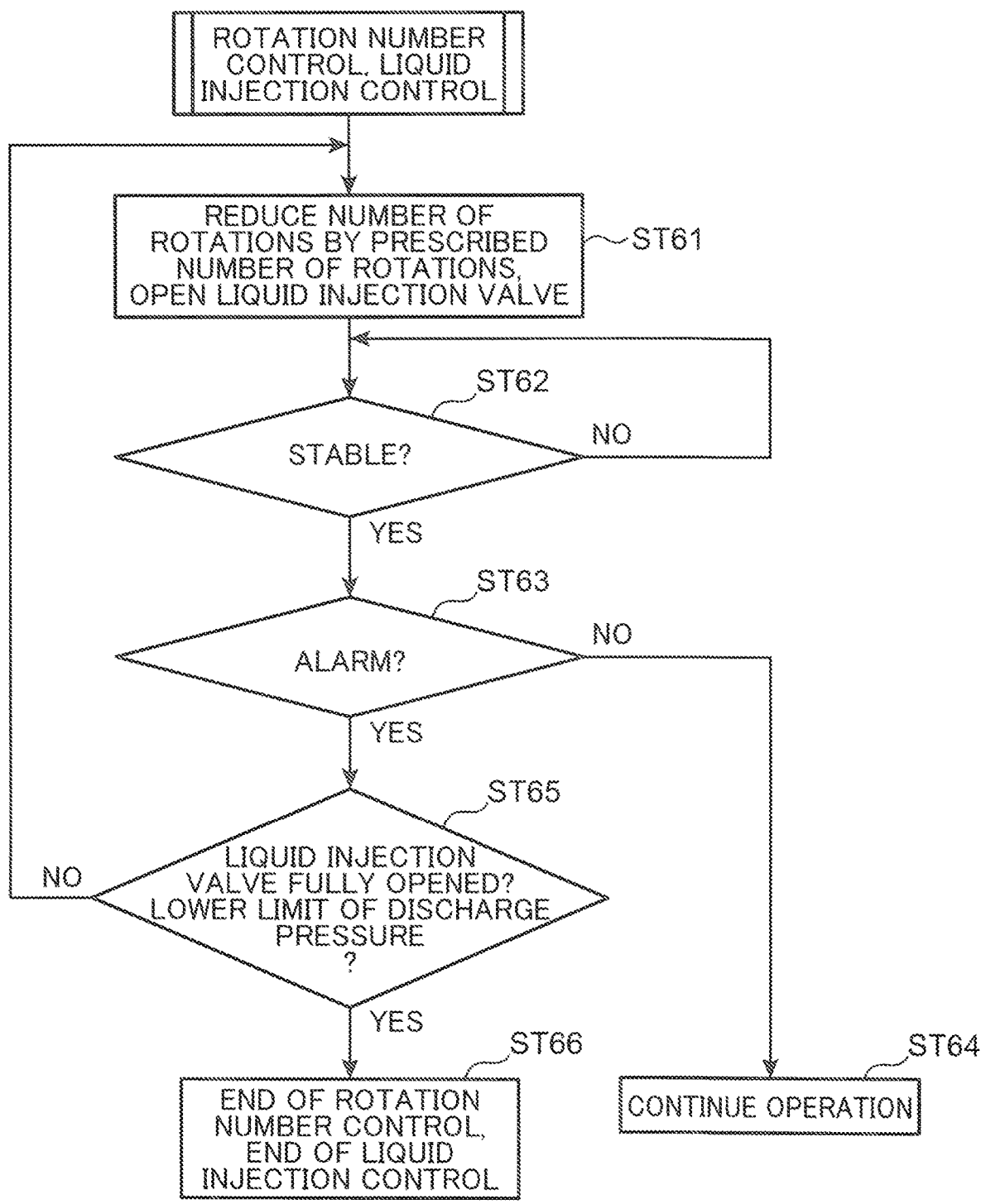
FIG. 7 is a flow chart showing a flow of rotation number control and liquid injection control in the abnormality treatment method in FIG. 6.

In this control, first, the control unit 14b specifically reduces the number of rotations of the rotating machine 12 by a prescribed number of rotations and also opens the liquid injection valve 31 by a prescribed opening as shown in FIG. 7 (step ST61). Then, after checking whether the discharge temperature or the discharge pressure is stabilized after the discharge temperature is lowered or not (step ST62), the control unit 14b checks whether the notice control is continued or not (step ST63). If the notice control is ended, the operation is continued (step ST64). On the other hand, if the notice control is not ended, the control unit 14b checks whether the liquid injection valve 31 is fully opened or not and also checks whether the discharge pressure reaches a lower limit value set in advance or not (step ST65). If none of the conditions is satisfied, the processing returns to step ST61 and when any of the conditions is satisfied, the rotation number control and the liquid injection control are ended (step ST66).

When the rotation number control and the liquid injection control end, the control unit 14b checks whether the notice control continues or not (step ST53) as shown in FIG. 6, and if the notice control is ended, the operation is continued as it is (step ST54). On the other hand, if the notice control is not ended, the control unit 14b executes the pressure control (step ST55). Then, when the notice control is still continued even after the pressure control ends (YES in step ST56), the control unit 14b stops the operation of the rotating machine 12 (step ST57).

In this mode, the control unit 14b simultaneously executes the rotation number control and the liquid injection control. In other words, even if a cause of the contact of the rotor 12b is not found, a plurality of approaches is made to prevent the contact from occurring. Therefore, it is possible to quickly shift to a state where no contact will occur or a state of less contact.

While in the embodiment, the liquid injection control and the pressure control are executed after the execution of the rotation number control, the present invention is not limited thereto, but at least one control of the rotation number control, the liquid injection control, and the pressure control may be executed. For example, the control unit 14b may be configured to execute only the rotation number control, or only the pressure control. Additionally, the control unit 14b may be configured to execute the liquid injection control or the rotation number control after the execution of the pressure control.

While in the embodiment, the control unit 14b is configured to execute the notice control, the present invention is not limited thereto, but the notice control may be omitted. Specifically, upon receiving the abnormality signal from the sensor 14a, the control unit 14b may execute at least one of the rotation number control, the liquid injection control, and the pressure control without executing control for notifying a worker.

Here, the embodiments will be outlined.

(1) The abnormality treatment apparatus for a rotating machine according to the above embodiment is provided with a sensor configured to output a signal upon detecting an event caused by contact of a rotor of the rotating machine during rotation of the rotor, and a control unit for executing at least one control of rotation number control of reducing the number of rotations of the rotor step by step, liquid injection control of injecting liquid into a housing chamber of the rotor step by step, and pressure control of lowering a discharge pressure of the rotating machine step by step on the basis of the reception of the signal output from the sensor.

In the abnormality treatment apparatus of the embodiment, upon detecting the event, the sensor outputs a signal. Upon receiving the signal, the control unit executes at least one control of the rotation number control, the liquid injection control, and the pressure control. When the rotation number control is executed, the number of rotations of the rotor is reduced, so that contact of the rotor might be avoided. Even if the contact state continues even after the rotation number control, by reducing the number of rotations of the rotor step-by-step, it is possible to bring about a state where contact of the rotor is avoided or a state of less contact. Additionally, step-by-step reduction in the number of rotations of the rotor enables a harmful effect to be suppressed which is caused by the reduction in the number of rotations from an optimum state. Accordingly, it is possible to continue the operation while preventing the rotating machine from developing a failure. Additionally, since when the liquid injection control is executed, liquid is introduced into the housing chamber of the rotor, the temperature of the rotor is lowered. This might bring the rotor into a non-contact state. Also in a case where the liquid injection control is executed, even if the contact state continues, step-by-step liquid injection can bring about a state where contact of the rotor is avoided or a state of less contact. Also, step-by-step liquid injection enables a harmful effect to be suppressed which is caused by the reduction of the temperature of the rotor in the housing chamber from an optimum state. Accordingly, it is possible to continue the operation while preventing the rotating machine from developing a failure. Additionally, since when the pressure control is executed, the discharge temperature is lowered, contact of the rotor might be avoided due to heat contraction of the rotor. Also, in a case where the pressure control is executed, even if the contact state continues, step-by-step reduction in the discharge pressure can bring about a state where the contact of the rotor is avoided or a state of little contact. Also, since the discharge pressure is lowered step by step, a harmful effect can be suppressed which is caused by the reduction of the discharge pressure from an optimum state. Accordingly, it is possible to continue the operation while preventing the rotating machine from developing a failure.

(2) In the abnormality treatment apparatus for a rotating machine, the control unit may be configured to simultaneously execute the rotation number control and the liquid injection control, or execute the liquid injection control after the execution of the rotation number control.

In this mode, in a case of simultaneously executing the rotation number control and the liquid injection control, even if a cause of the contact of the rotor is not found, a plurality of approaches is made to prevent the contact from occurring. Therefore, it is possible to quickly shift to a state where no contact will occur or a state of less contact. By contrast, in a case of executing the liquid injection control after the execution of the rotation number control, the liquid injection control is executed only when the contact is not eliminated or when the degree of contact is not reduced even if the rotation number control is executed. This enables contact to be eliminated while maintaining a state where the temperature of the rotor in the housing chamber is not lowered from an optimum state as much as possible.

(3) The control unit may be configured to execute the pressure control after the execution of the rotation number control and the liquid injection control.

In this mode, even in a case where the contact is not eliminated or in a case where the contact is not reduced even by the rotation number control and the liquid injection control, the pressure control might eliminate such a state, and execution of this control is therefore effective in such a case. Specifically, a plurality of controls is executed in a case where contact occurs. Therefore, even if no cause of contact is found, the contact of the rotor might be eliminated and is accordingly effective in such a case.

(4) The control unit monitors the discharge pressure or a discharge temperature of the rotating machine in the rotation number control, and may reduce the number of rotations of the rotor step by step by again reducing the number of rotations of the rotor by a prescribed number of rotations when the signal is output from the sensor even if the discharge pressure or the discharge temperature is stabilized after reducing the number of rotations of the rotor by a prescribed number of rotations.

In this mode, after reducing the number of rotations of the rotor by reducing a prescribed number of rotations in the rotation number control, the control unit waits for the discharge pressure or the discharge temperature to be stabilized. Even when the discharge pressure or the discharge temperature is stabilized, if the signal is output from the sensor, the control unit again reduces the number of rotations of the rotor. Accordingly, it is possible to more precisely determine an effect obtained by the reduction in the number of rotations and is also possible to reduce the number of rotations by a necessary number. It is accordingly possible to suppress a harmful effect caused by the reduction in the number of rotations from an optimum state.

(5) The control unit monitors the discharge temperature of the rotating machine in the liquid injection control, and may execute liquid injection into the housing chamber step by step by again executing the liquid injection into the housing chamber when the signal is output from the sensor even if the ejection temperature is stabilized after the liquid injection into the housing chamber.

In this mode, after injecting liquid, the control unit waits for the discharge temperature to be stabilized and even when the discharge temperature is stabilized, if the signal is output from the sensor, again injects liquid. Accordingly, it is possible to more precisely determine an effect obtained by injecting the liquid and also possible to suppress excessive liquid injection because only a necessary amount of liquid can be injected.

(6) The control unit monitors the discharge pressure or the discharge temperature of the rotating machine in the pressure control, and may lower the discharge pressure step by step by again executing control to lower the discharge pressure when the signal is output from the sensor even if the discharge pressure or the discharge temperature is stabilized after the execution of the control to lower the discharge pressure.

In this mode, the control unit waits for the discharge pressure or the discharge temperature to be stabilized after lowering the discharge pressure in the pressure control, and again lowers the discharge pressure when the signal is output from the sensor even if the discharge pressure or the discharge temperature is stabilized. Accordingly, it is possible to more precisely determine an effect obtained by lowering the discharge pressure and also possible to lower the discharge pressure by a necessary amount. It is accordingly possible to suppress a harmful effect caused by the reduction in the discharge pressure from an optimum state.

(7) The rotating machine system according to the embodiment is provided with a rotating machine which has a casing in which a rotor, and a housing chamber housing the rotor are provided, and an abnormality treatment apparatus for the rotating machine. The sensor of the rotating machine is attached to the casing.

(8) The rotating machine system may be provided with a liquid injection line for injecting liquid into the housing chamber of the rotor even when the signal is not output from the sensor during operation of the rotating machine. In this case, upon receiving the signal output from the sensor, the control unit may inject more liquid than that in a case where the signal is not output from the sensor in the liquid injection control.

In this mode, the liquid injection line injects liquid into the housing chamber of the rotating machine irrespective of output of the signal from the sensor. This enables contact during the rotation of the rotor to hardly occur. Then, an amount of liquid injection is increased when the liquid injection control is executed in response to output of a signal which is output when an event caused by contact is detected, such as when contact of the rotor with the housing chamber or the like is detected. It is therefore possible to bring about a state where the contact of the rotor is avoided or a state of little contact.

As described in the foregoing, even when contact of the rotor occurs, the operation of the rotating machine can be continued as much as possible.

This application is based on Japanese Patent Application No. 2018-121141 filed on Jun. 26, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An abnormality treatment apparatus for a rotating machine, comprising:
   a sensor configured to output a signal upon detecting an event caused by contact of a rotor of the rotating machine with another portion of the rotating machine during rotation of the rotor; and
   a control unit for executing at least one of a rotation number control of reducing a number of rotations of the rotor step by step, a liquid injection control of injecting liquid into a housing chamber of the rotor via a liquid injection line step by step, and a pressure control of lowering a discharge pressure of the rotating machine step by step, based on reception of the signal output from the sensor,
   wherein the control unit is configured to simultaneously execute the rotation number control and the liquid injection control, or execute the liquid injection control after execution of the rotation number control.

2. The abnormality treatment apparatus for a rotating machine according to claim 1, wherein the control unit is configured to execute the pressure control after execution of the rotation number control and the liquid injection control.

3. The abnormality treatment apparatus for a rotating machine according to claim 1, wherein the control unit;
   reduces the number of rotations of the rotor by a prescribed number of rotations step by step by the rotation number control,
   monitors the discharge pressure or a discharge temperature of the rotating machine in the rotation number control, and
   reduces the number of rotations of the rotor step by step by repeating the reducing of the number of rotations of the rotor by the prescribed number of rotations when the signal is output from the sensor even if the discharge pressure or the discharge temperature is stabilized.

4. The abnormality treatment apparatus for a rotating machine according to claim 1, wherein the control unit:
   executes the liquid injection by injecting liquid into the housing chamber of the rotor via the liquid injection line step by step,
   monitors a discharge temperature of the rotating machine in the liquid injection control, and
   executes the liquid injection into the housing chamber step by step by repeating the executing of the liquid injection when the signal is output from the sensor even if the discharge temperature is stabilized.

5. The abnormality treatment apparatus for a rotating machine according to claim 1, wherein the control unit:
   executes the pressure control of lowering the discharge pressure of the rotating machine step by step,
   monitors the discharge pressure or a discharge temperature of the rotating machine in the pressure control, and
   lowers the discharge pressure step by step by repeating the executing of the pressure control to lower the discharge pressure when the signal is output from the sensor even if the discharge pressure or the discharge temperature is stabilized.

6. A rotating machine system comprising:
   a rotating machine which includes a casing in which a rotor, and a housing chamber housing the rotor are provided; and
   the abnormality treatment apparatus for the rotating machine according to claim 1, wherein
   the sensor of the abnormality treatment apparatus for the rotating machine is attached to the casing.

7. The rotating machine system according to claim 6, further comprising a liquid injection line for injecting liquid into the housing chamber of the rotor even when the signal is not output from the sensor during operation of the rotating machine, wherein
   upon receiving the signal output from the sensor, the control unit is configured to inject more liquid than that in a case where the signal is not output from the sensor in the liquid injection control.

* * * * *